United States Patent
Yamaguchi et al.

(10) Patent No.: US 8,744,699 B2
(45) Date of Patent: Jun. 3, 2014

(54) APPARATUS FOR CONTROLLING MULTIPLE BICYCLE OPERATING CHARACTERISTICS

(75) Inventors: Sota Yamaguchi, Sakai (JP); Satoshi Shahana, Osaka (JP)

(73) Assignee: Shimano, Inc., Sakai (JP)

( * ) Notice: Subject to any disclaimer, the term of this patent is extended or adjusted under 35 U.S.C. 154(b) by 468 days.

(21) Appl. No.: 13/253,427

(22) Filed: Oct. 5, 2011

(65) Prior Publication Data

US 2013/0090195 A1    Apr. 11, 2013

(51) Int. Cl.
*B62M 9/128* (2010.01)

(52) U.S. Cl.
USPC ............................................ 701/51

(58) Field of Classification Search
CPC ........................... B62M 9/128; F16H 61/0213
USPC .............................................. 701/51; 474/80
See application file for complete search history.

(56) References Cited

U.S. PATENT DOCUMENTS

| | | | |
|---|---|---|---|
| 4,406,643 A | 9/1983 | Shimano | |
| 5,065,633 A | 11/1991 | Mercat | |
| 6,135,904 A | 10/2000 | Guthrie | |
| 2007/0021248 A1* | 1/2007 | Shahana et al. | 474/83 |
| 2007/0213908 A1* | 9/2007 | Guderzo et al. | 701/51 |
| 2007/0219029 A1 | 9/2007 | Turner | |
| 2009/0054183 A1 | 2/2009 | Takachi et al. | |
| 2009/0088934 A1* | 4/2009 | Takebayashi | 701/51 |
| 2009/0204299 A1* | 8/2009 | Miglioranza | 701/51 |
| 2009/0291789 A1 | 11/2009 | Ishikawa et al. | |

FOREIGN PATENT DOCUMENTS

| | | |
|---|---|---|
| EP | 0841549 B1 | 9/2002 |
| EP | 2128014 A1 | 12/2009 |

OTHER PUBLICATIONS

U.S. Appl. No. 12/895,705, "Bicycle Derailleur With Rotation Resistance," Yamaguchi etal., filed Sep. 30, 2010, unpublished as of the filed of this application.

* cited by examiner

*Primary Examiner* — Edwin A Young
(74) *Attorney, Agent, or Firm* — James A. Deland

(57) ABSTRACT

A bicycle operating characteristic control apparatus includes a first bicycle component and a second bicycle component, wherein the second bicycle component is changeable from a first status to a second status. The first bicycle component includes a base member for coupling to a bicycle frame, a movable member coupled for movement relative to the base member, and a chain guide coupled to the movable member for guiding a chain among a plurality of sprockets in response to movement of the movable member. A biasing device provides a biasing force to the chain guide for tensioning the chain, and a rotation resistance changing device changes a rotational resistance of the chain guide relative to the movable member. The first bicycle component and the second bicycle component are operatively coupled so that rotational resistance of the chain guide changes in conjunction with a change of status of the second bicycle component.

18 Claims, 5 Drawing Sheets

APPARATUS FOR CONTROLLING MULTIPLE BICYCLE OPERATING CHARACTERISTICS

BACKGROUND OF THE INVENTION

The present invention is directed to bicycle control devices and, more particularly, to various features of an apparatus for controlling multiple bicycle operating characteristics.

Bicycles have several operating components. For example, a bicycle transmission may comprise a plurality of front sprockets and a plurality of rear sprockets, wherein the plurality of front sprockets are mounted for rotation with the pedals, and the plurality of rear sprockets are mounted for rotation with the rear wheel. To change the gear ratio of the bicycle transmission, a front derailleur switches a chain to engage the various front sprockets, and a rear derailleur switches the chain to engage the various rear sprockets. Because the length of chain needed to engage a particular combination of front and rear sprockets changes depending upon the chosen sprocket combination, the chain must be long enough to engage the largest front sprocket and the largest rear sprocket, and some mechanism must be provided to take up the slack in the chain when the chain engages a smaller sprocket combination. Conventionally, the rear derailleur is provided with a chain guide that includes an upper guide sprocket and a lower tension sprocket, and the chain guide is spring-biased to rotate to take up the slack in the chain.

When the bicycle is ridden over rough terrain, the resulting shocks and vibrations may overcome the biasing force of the chain guide spring, and the chain guide may rotate in the chain loosening direction. Such undesirable rotation increases the risk that the chain derails from the currently-engaged sprocket and/or becomes caught between adjacent sprockets. To overcome such problems, various motion damping mechanisms for the chain guide have been developed. For example, U.S. patent application Ser. No. 12/895,705 titled Bicycle Derailleur With Rotation Resistance discloses a bicycle derailleur that comprises a base member, a movable member movably coupled to the base member, and a chain guide coupled to the movable member for rotation around a rotational axis. A resistance applying element applies resistance to rotational movement of the chain guide, and a resistance control element is operatively coupled to the resistance applying element so that the resistance applying element applies different first and second resistances to rotational movement of the chain guide when the resistance control element is disposed in respective first and second positions.

Some bicycles include front and/or rear suspension elements. The front suspension element typically comprises a pair of shock absorbers that form opposite portions of the legs of the front wheel fork, and the rear suspension element typically comprises a shock absorber with one end mounted to the front portion of the frame and another end mounted to a pivoting rear swing arm that supports the rear wheel. In any case, the shock absorber usually comprises an outer tubular suspension member and an axially telescoping inner tubular suspension member. A piston has an outer peripheral surface that sealingly and slidably engages the inner peripheral surface of the inner tubular suspension member to form a compression chamber in which a compressible fluid such as air is disposed. The piston is coupled to the outer tubular suspension member by a piston rod. Some shock absorbers include separate chambers disposed on opposite sides of the piston so that further operating parameters, such as ride height or stroke, may be controlled.

Some shock absorbers are constructed to allow the rider to vary several operating parameters to accommodate varying riding conditions. Such parameters include spring preload (for shock absorbers that use a coil spring), compression damping (to control the rate of shock absorber retraction), rebound damping (to control the rate of shock absorber extension), platform damping (to damp oscillation of the shock absorber caused by pedaling forces), cylinder pressure, cylinder volume, and lockout (the ability to turn the normal shock absorbing function on and off).

Bicycles usually also include adjustable seats. A typical bicycle seat comprises a saddle mounted to a seat post. The seat post is dimensioned to be inserted into a seat tube of the bicycle frame, and a clamp is used to clamp the seat tube around the seat post and thereby hold the saddle at a desired height. Some bicycles include an electric motor with a gear that engages gear teeth on the seat post in order to electrically adjust the saddle height and maintain the saddle at a desired height.

SUMMARY OF THE INVENTION

The present invention is directed to various features of an apparatus for controlling multiple bicycle operating characteristics. In one embodiment, a bicycle operating characteristic control apparatus comprises a first bicycle component and a second bicycle component, wherein the second bicycle component is changeable from a first status to a second status. The first bicycle component includes a base member for coupling to a bicycle frame, a movable member coupled for movement relative to the base member, and a chain guide coupled to the movable member for guiding a chain among a plurality of sprockets in response to movement of the movable member. A biasing device provides a biasing force to the chain guide for tensioning the chain, and a rotation resistance changing device changes a rotational resistance of the chain guide relative to the movable member. The first bicycle component and the second bicycle component are operatively coupled so that rotational resistance of the chain guide changes in conjunction with a change of status of the second bicycle component. Additional inventive features will become apparent from the description below, and such features may be combined with the above features to provide additional benefits.

DETAILED DESCRIPTION OF THE EMBODIMENTS

Figure 1:
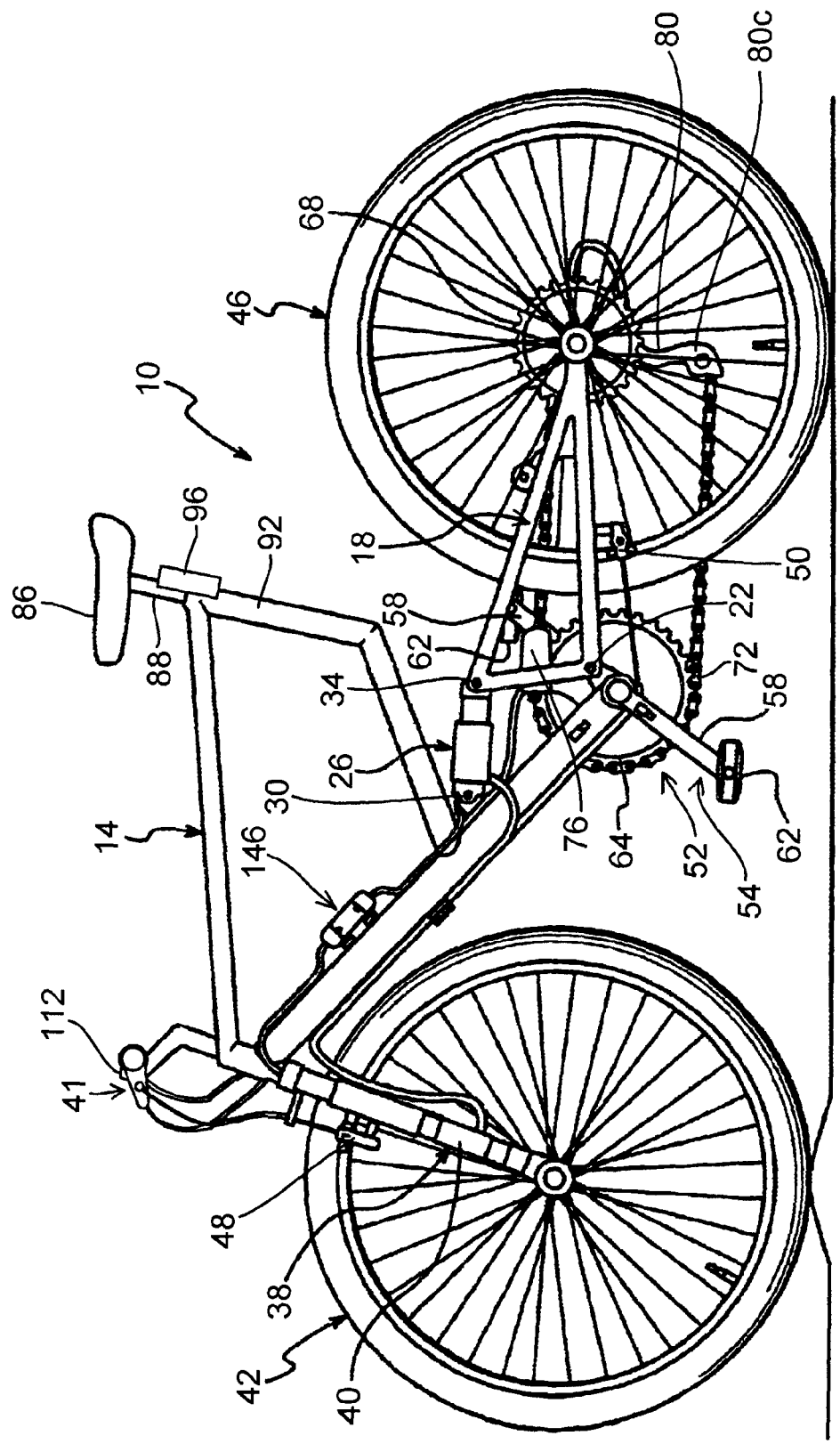
FIG. 1 is a side view of a bicycle that includes particular embodiments of adjustable components.

FIG. 1 is a side view of a bicycle 10 that includes particular embodiments of adjustable components. In this embodiment, bicycle 10 is a sport bicycle in the form of a mountain bicycle, and it comprises a front frame portion 14, a rear frame portion 18 pivotably coupled to front frame portion 14 through a pivot shaft 22, a rear suspension element 26 with a front end pivotably coupled to front frame portion 14 through a pivot shaft 30 and a rear end pivotably coupled to rear frame portion 18 through a pivot shaft 34, a front fork 38 rotatably mounted to front frame portion 14 and including a pair of front suspension elements 40, a handlebar assembly 41 mounted to the upper part of fork 38, a front wheel 42 rotatably attached to the lower part of fork 38, a rear wheel 46 rotatably attached to the rear of rear frame portion 18, a front brake 48 for braking front wheel 42, a rear brake 50 for braking rear wheel 46, and a drive mechanism 52.

Drive mechanism 52 comprises a pedal crank 54 that includes a pair of crank arms 58 with attached pedals 62, a plurality of front sprockets 64 attached to pedal crank 54, a plurality of rear sprockets 68 attached to rear wheel 46, a chain 72, an electrically-controlled front derailleur transmission 76 for engaging chain 72 with selective ones of the plurality of front sprockets 64, and an electrically-controlled rear derailleur transmission 80 for engaging chain 72 with selective ones of the plurality of rear sprockets 68. A front derailleur position sensor ((78), FIG. 3) is operatively coupled to front derailleur transmission 76 to detect the position of front derailleur transmission 76 and hence the front sprocket 64 currently engaged by chain 72.

Rear derailleur transmission 80 has a conventional structure including a base member 80a (FIG. 3), a movable member 80b movably coupled to base member 80a, and a chain guide 80c coupled to movable member 80b for rotation around a rotational axis. A rear derailleur position sensor (82) is operatively coupled to rear derailleur transmission 80 to detect the position of rear derailleur transmission 80 and hence the rear sprocket 68 currently engaged by chain 72. A rotation resistance changing device 83 is operatively coupled to rear derailleur transmission 80 to apply resistance to rotation of chain guide 80c relative to movable member 80b. Base member 80a, movable member 80b, chain guide 80c, rotation resistance changing device 83 and associated linkages of rear derailleur transmission 80 preferably is constructed according to the teachings of U.S. patent application Ser. No. 12/895,705 discussed above wherein a resistance applying element and a corresponding resistance control unit are used to selectively apply resistance to rotation of the chain guide relative to the movable member disclosed therein. A driver control unit 84 is provided for electrically operating (e.g., pressing, sliding or rotating) the mechanical components (e.g., a lever, cam or push button) used to control the resistance applied to chain guide 80c as well as to move chain guide 80c from one sprocket to another.

A bicycle seat in the form of a saddle 86 is mounted to front frame portion 14 through a seat post 88 that telescopically fits within a seat tube 92 of front frame portion 14. A seat position sensor 96 is mounted to seat tube 92 and cooperates with seat post 88 to sense the position of saddle 86 relative to seat tube 92. A seat position driver ((98), FIG. 3) is mounted within seat tube 92 and is connected to seat post 88 to adjust the height of saddle 86. Seat position driver 98 may be an electric motor such as a screw-drive motor, or it may be an air-operated motor, a hydraulic fluid motor, and so on. Seat position sensor 96 may comprise a variable electrical resistance such as a contact strip mounted to seat tube 92 and an electrical brush mounted to seat post 88, a potentiometer with a gear shaft mounted to seat tube 92 and a toothed rack formed in or mounted to seat post 88, an optical sensor comprising a phototransistor mounted to seat tube and a shutter strip mounted to seat post 88, an internally mounted pressure sensor (in the case of an air or hydraulic drive motor), or some other suitable sensor.

Figure 2:
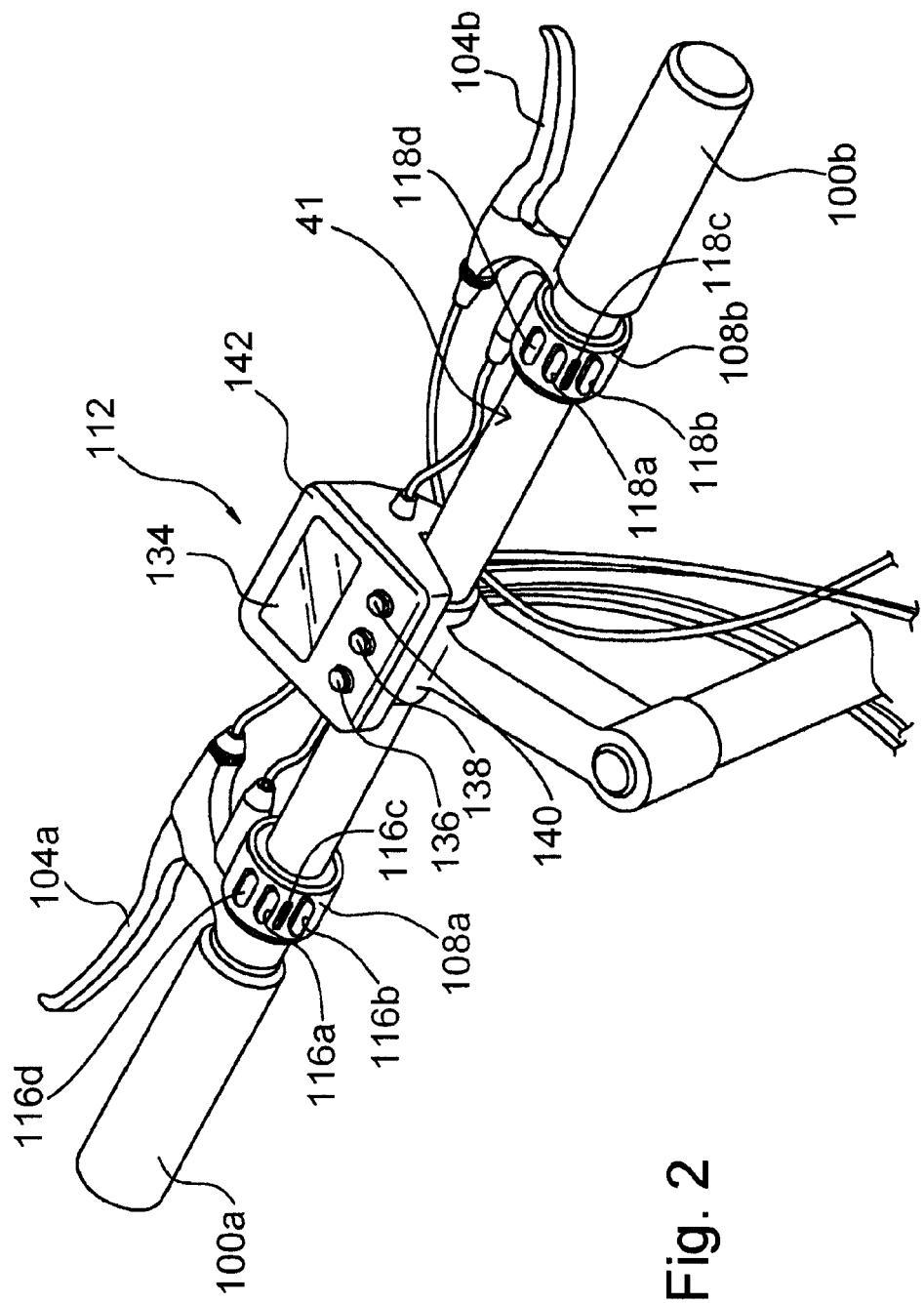
FIG. 2 is a detailed view of particular embodiments of handlebar mounted components of the bicycle shown in FIG. 1.

As shown in FIG. 2, respective grips 100a, 100b and brake levers 104a, 104b are provided on both ends of handlebar assembly 41. Brake lever 104a is connected to front wheel brake 48 for braking front wheel 42, and brake lever 104b is connected to rear wheel brake 50 for braking rear wheel 46. Command units 108a, 108b are provided inwardly of grips 100a, 100b and brake levers 104a, 104b, respectively, and a bicycle characteristic control unit 112 is attached to the central portion of handlebar assembly 41.

Command units 108a and 108b are used for shifting front derailleur transmission 76 and rear derailleur transmission 80, for controlling the height of saddle 86, and for controlling the operating characteristics of rear suspension 26 and front suspension 40. More specifically, a front upshift button 116a, a front downshift button 116b, a seat-up button 116c and a front suspension control button 116d are provided in command unit 108a, and a rear upshift button 118a, a rear downshift button 118b, a seat-down button 118c and a rear suspension control button 118d are provided in command unit 108b. In this embodiment, upshift buttons 116a and 118a provide signals to bicycle characteristic control unit 112 for upshifting front and rear derailleur transmissions 76 and 80, respectively, by one gear ratio, and downshift buttons 116b and 118b provide signals to bicycle characteristic control unit 112 for downshifting front and rear derailleur transmissions 76 and 80, respectively, by one gear ratio. Seat-up button 116c provides signals to bicycle characteristic control unit 112 to raise saddle 86, and seat-down button 118c provides signals to bicycle characteristic control unit 112 to lower saddle 86. Front and rear suspension control buttons 116d and 118d provide signals to bicycle characteristic control unit 112 to control a number of functions of front and rear suspensions 40 and 26, respectively. Such functions are described in more detail below.

Figure 3:
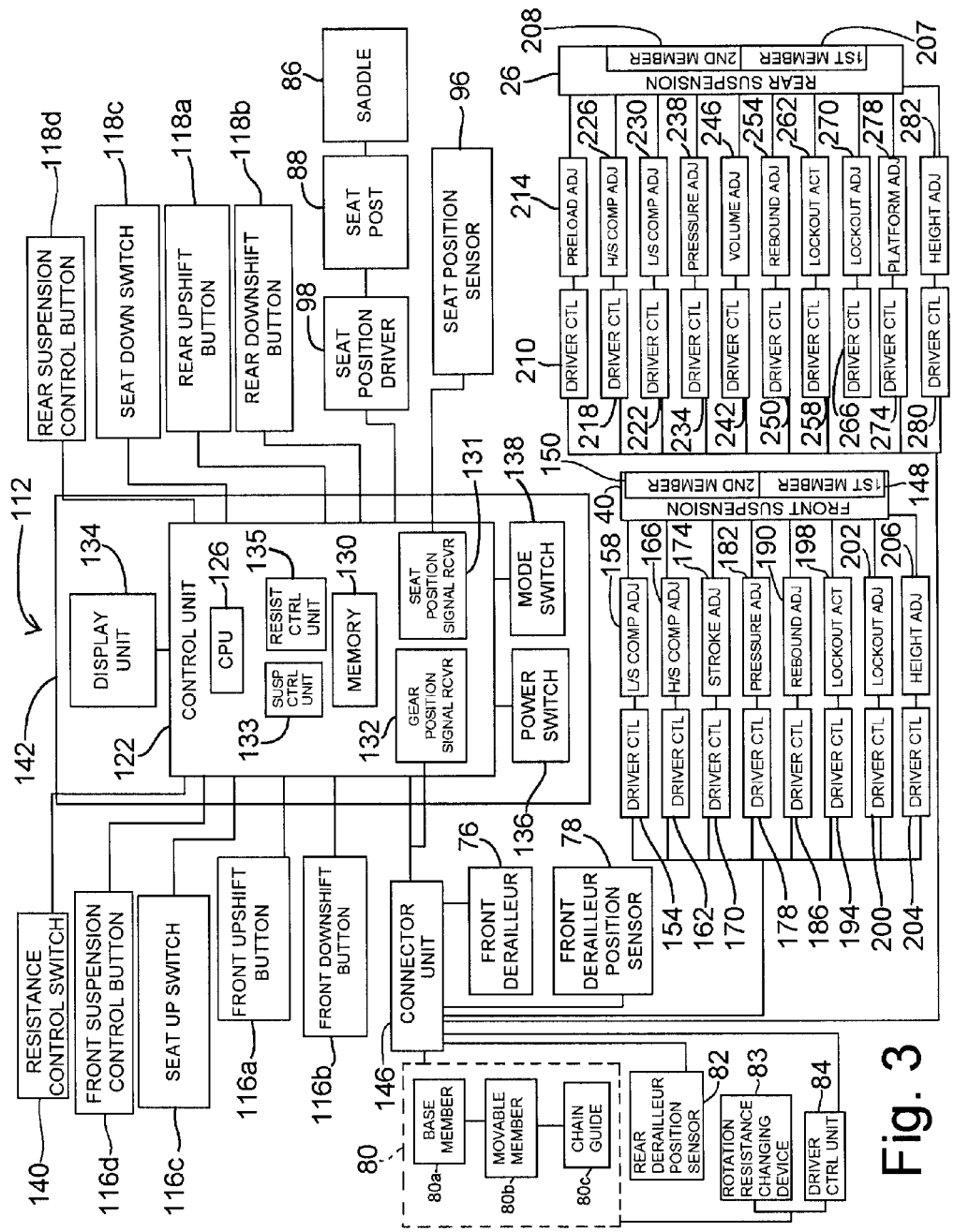
FIG. 3 is a block diagram of a particular embodiment of a control mechanism.

As shown in FIG. 3, bicycle characteristic control unit 112 is electrically connected through appropriate wiring to the electrical components associated with command units 108a, 108b, to the electrical components associated with rear suspension 26, to the electrical components associated with front suspension 40, to the electrical components associated with front derailleur transmission 76, to the electrical components associated with rear derailleur transmission 80, and to the electrical components associated with saddle 86. Of course, bicycle characteristic control unit 112 may be operatively coupled to any one of those components by appropriate wireless communication devices as well.

Bicycle characteristic control unit 112 comprises a control unit 122 having a CPU 126, a memory 130, a seat position signal receiver 131 for receiving the seat position signals from seat position sensor 96, a gear position signal receiver 132 for receiving gear position signals from front derailleur position sensor 76 and rear derailleur position sensor 82, a suspension control unit 133 that provides control signals to control the operating parameters of rear suspension element 26 and front suspension elements 40, a resistance control unit 135 that provides control signals to control the resistance applied to chain guide 80c, a display unit 134 for displaying the current gear ratio and other information, a power switch 136, a mode switch 138, and a rear derailleur resistance control switch 140. CPU 126 is a programmed processor that operates according to the information stored in memory 130. Seat position signal receiver 131 and gear position signal receiver 132 may comprise appropriate input terminals and buffers to convert the input signals into proper signals for use by the control programs, they may comprise wireless receivers, optical receivers, and so on. Power switch 136 turns bicycle characteristic control unit 112 on and off. Mode switch 138 changes an operating mode of bicycle characteristic control unit 112 and may be used in conjunction with front suspension control button 116d and rear suspension control button 118d to select and control the desired functions of rear suspension element 26 and front suspension elements 40. Resistance control switch 140 is used to control user-controllable operating parameters of rotation resistance changing device 83.

As shown in FIG. 2, bicycle characteristic control unit 112 includes a box-like housing 142. Display unit 134, power switch 136, mode switch 138 and resistance control switch 140 are arranged on the upper surface of housing 142. As shown in FIGS. 1 and 3, bicycle characteristic control unit 112 is connected to the electrical components associated with front derailleur transmission 76, to the electrical components associated with rear derailleur transmission 80, to the electrical components associated with rear suspension element 26 and to the electrical components associated with front suspension elements 40 by a connector unit 146.

In this embodiment, front suspension elements 40 comprise a pair of air-operated shock absorbers. As shown schematically in FIG. 3, each shock absorber comprises a first member (e.g., a piston) 148 that moves relative to a second member (e.g., a cylinder chamber) 150. External adjustment elements are provided for low speed and high speed compression damping (e.g., driver control units 154, 162 and a separate lever-operated adjustment knob 158, 166 for each setting), for stroke (piston travel or compression chamber volume) (e.g., a driver control unit 170 and a lever-operated adjustment knob 174), for air chamber pressure (e.g., a driver control unit 178 and an air valve 182), for rebound damping (e.g., a driver control unit 186 and a lever-operated adjustment knob 190), for lockout actuation (e.g., a driver control unit 194 and a lever-operated actuation knob 198), for lockout force adjustment (e.g., a driver control unit 200 and a lever-operated adjustment knob 202) and for height adjustment (e.g., a driver control unit 204 and a lever-operated adjustment knob or valve 206).

In this embodiment, rear suspension element 26 comprises a combination air-and oil-operated shock absorber comprising a first member (e.g., a piston) 207 that moves relative to a second member (e.g., a cylinder chamber) 208 with a typical external spring (not shown in the drawings). External adjustment elements are provided for spring preload (e.g., a driver control unit 210 and a lever-operated adjustment nut 214), for low speed and high speed compression damping (e.g., driver control units 218, 222 and a separate lever-operated knob 226, 230 for each setting), for air chamber pressure adjustment (e.g., a driver control unit 234 and an air pressure adjusting valve 238), for air chamber volume adjustment (e.g., a driver control unit 242 and a lever-operated adjustment screw 246), for rebound damping (e.g., a driver control unit 250 and a lever-operated adjustment knob 254), for lockout actuation (e.g., a driver control unit 258 and a lever-operated actuating knob 262), for lockout force adjustment (e.g., a driver control unit 266 and a lever-operated adjustment knob 270), for platform (anti-bobbing) adjustment (e.g., a driver control unit 274 and a lever-operated actuating valve 278), and for height adjustment (e.g., a driver control unit 280 and a lever-operated adjustment knob or valve 282). Air chamber pressure and volume adjustments may be used to adjust the pressure and volume of the main air chamber or for platform (pedaling) damping. Examples of such parameter adjustments may be found in current shock absorbers sold by Fox and Manitou, for example.

Driver control units for adjustment elements that make adjustments in a continuous manner (e.g., compression damping of rear suspension element 26 and front suspension elements 40, rotation resistance in rear derailleur transmission 80) may comprise continuous-movement motors or some other suitable motor together with position sensors (potentiometers, resistive position sensors, optical position sensors, contact switches, etc.) that indicate the operating position of the associated knob, lever or other adjusting element. If desired, each driver control unit may include its own microprocessor to control the operation of its associated motor in response to signals provided by suspension control unit 133 and resistance control unit 135 and to provide status signals to control unit 122. Similarly, driver control units for adjustment elements that make adjustments in discrete increments (e.g., three-step stroke adjustment of rear suspension elements 26 and front suspension elements 40, multistep resistance adjustment (low, medium, high, etc.) for rear derailleur transmission 80) may comprise stepper motors or some other suitable motor together with position sensors that indicate the operating position of the associated knob, lever or other adjusting element and with any desired additional microprocessors. Driver control units for adjustment elements that operate in an on/off manner (e.g., lockout actuation of rear suspension element 26 and front suspension elements 40, ON/OFF resistance for rear derailleur transmission 80) may comprise a solenoid or some other suitable driver together with position sensors that indicate the operating position of the associated knob, lever or other adjusting element and with any desired additional microprocessors.

In this embodiment, the electrical components associated with rear suspension 26, the electrical components associated with front suspension 40, the electrical components associated with rear derailleur transmission 80, and the electrical components associated with saddle 86 are operatively coupled so that changes to one component result in changes to the status or operation characteristic (e.g., position, movement, pressure or volume relation of a first member relative to a second member) of at least one other component. The following tables provide examples of the conjoined operation of various components when rotation resistance changing device 83 for rear derailleur transmission 80 has basic ON/OFF operation.

TABLE 1

| Rear Derailleur Resistance | Front Suspension Lockout |
|---|---|
| OFF | ON |
| ON | OFF |

TABLE 2

| Rear Derailleur Resistance | Front Suspension Height |
|---|---|
| OFF | LOW |
| ON | HIGH |

TABLE 3

| Rear Derailleur Resistance | Rear Suspension Lockout |
|---|---|
| OFF | ON |
| ON | OFF |

TABLE 4

| Rear Derailleur Resistance | Rear Suspension Platform Damping |
|---|---|
| OFF | ON |
| ON | OFF |

TABLE 5

| Rear Derailleur Resistance | Seat Height |
|---|---|
| OFF | HIGH |
| ON | LOW |

The following tables provide examples of the conjoined operation of various components when rotation resistance changing device 83 for rear derailleur transmission 80 has multistep operation.

TABLE 6

| Rear Derailleur Resistance | Front Suspension Height |
|---|---|
| OFF | LOW |
| ON - Low Resistance | MIDDLE |
| ON - High Resistance | HIGH |

TABLE 7

| Rear Derailleur Resistance | Seat Height |
|---|---|
| OFF | HIGH |
| ON - Low Resistance | MIDDLE |
| ON - High Resistance | LOW |

Of course, the operation of any number of components may be conjoined as shown by the following table.

TABLE 8

| Rear Derailleur Resistance | Front Suspension Height | Rear Suspension Platform Damping | Seat Height |
|---|---|---|---|
| OFF | LOW | ON | HIGH |
| ON | HIGH | OFF | MIDDLE |

In the preferred embodiment, rear derailleur resistance functions as the reference variable. In other words, after the user sets the desired rear derailleur resistance, the algorithm checks the state of rotation resistance changing device 83 for rear derailleur transmission 80 and then adjusts the other components accordingly at approximately the same time. For example, in the embodiment shown in Table 8, the algorithm first determines whether rear derailleur resistance is set to OFF. If so, then the height of front suspension 40 is set to LOW, platform damping of rear suspension 26 is set to ON, and the height of saddle 86 is set to HIGH. Of course, the status or operation characteristic of any component could be used as the reference variable depending upon the application, and the status or operation characteristic of more than one component could be used as a combination reference variable through an appropriate Boolean operation.

Figure 4:
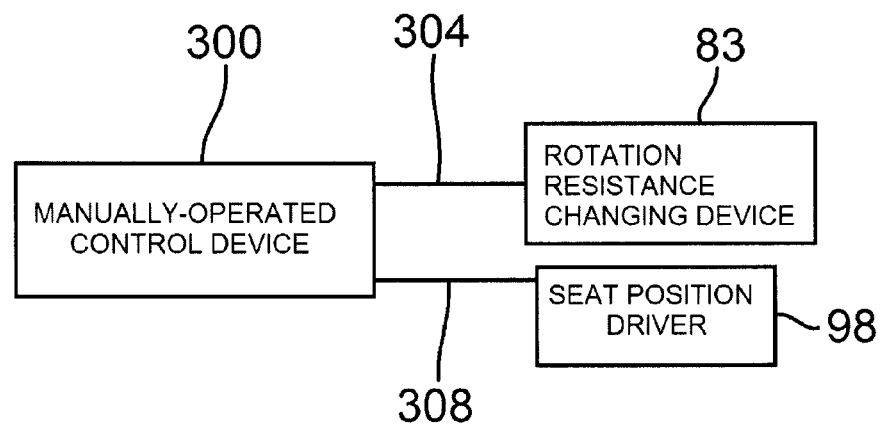
FIG. 4 is a schematic diagram of a manually-operated control device operatively coupled to two other bicycle components.

While the above is a description of various embodiments of inventive features, further modifications may be employed without departing from the spirit and scope of the present invention. For example, in the described embodiment the resistance applied to rotation of chain guide 80c of rear derailleur transmission 80, the height of saddle 86 and the operating characteristics of rear suspension 26 and front suspension elements 40 were electrically controlled, but the teaching herein could be applied to the manual operation of one or more components. For example, as schematically shown in FIG. 4, a single manually-operated control device 300 such as a control lever could be coupled to a manually-operated control component in rotation resistance changing device 83 and to a manually-operated control component in seat position driver 98 through two parallel-connected Bowden cables 304 and 308, wherein one end of each Bowden cable 304 and 308 is operatively coupled to manually-operated control device 300, the other end of Bowden cable 304 is operatively coupled to the manually-operated control component in rotation resistance changing device 83, and the other end of Bowden cable 308 is operatively coupled to the manually-operated control component in seat position driver 98.

Figure 5:
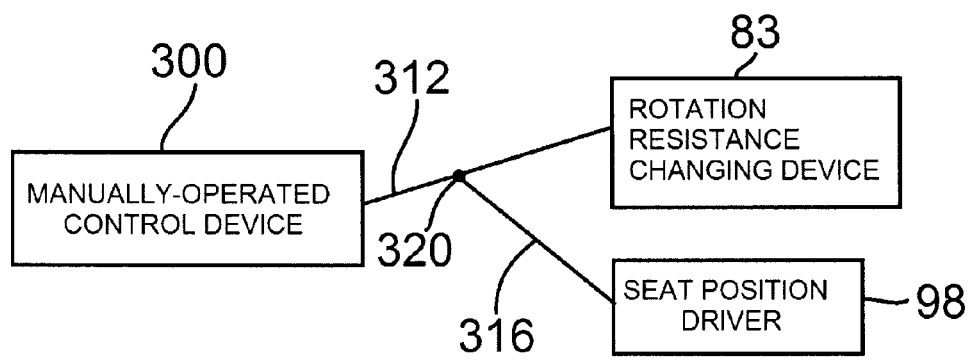
FIG. 5 is a schematic diagram of another embodiment of a manually-operated control device operatively coupled to two other bicycle components.

Alternatively, as schematically shown in FIG. 5, manually-operated control device 300 could be operatively coupled to the manually-operated control component in rotation resistance changing device 83 through a first Bowden cable 312, and the manually-operated control component in seat position driver 98 could be operatively coupled to manually-operated control device 300 through a second Bowden cable 316 that is spliced to an intermediate location 320 of first Bowden cable 312.

Figure 6:
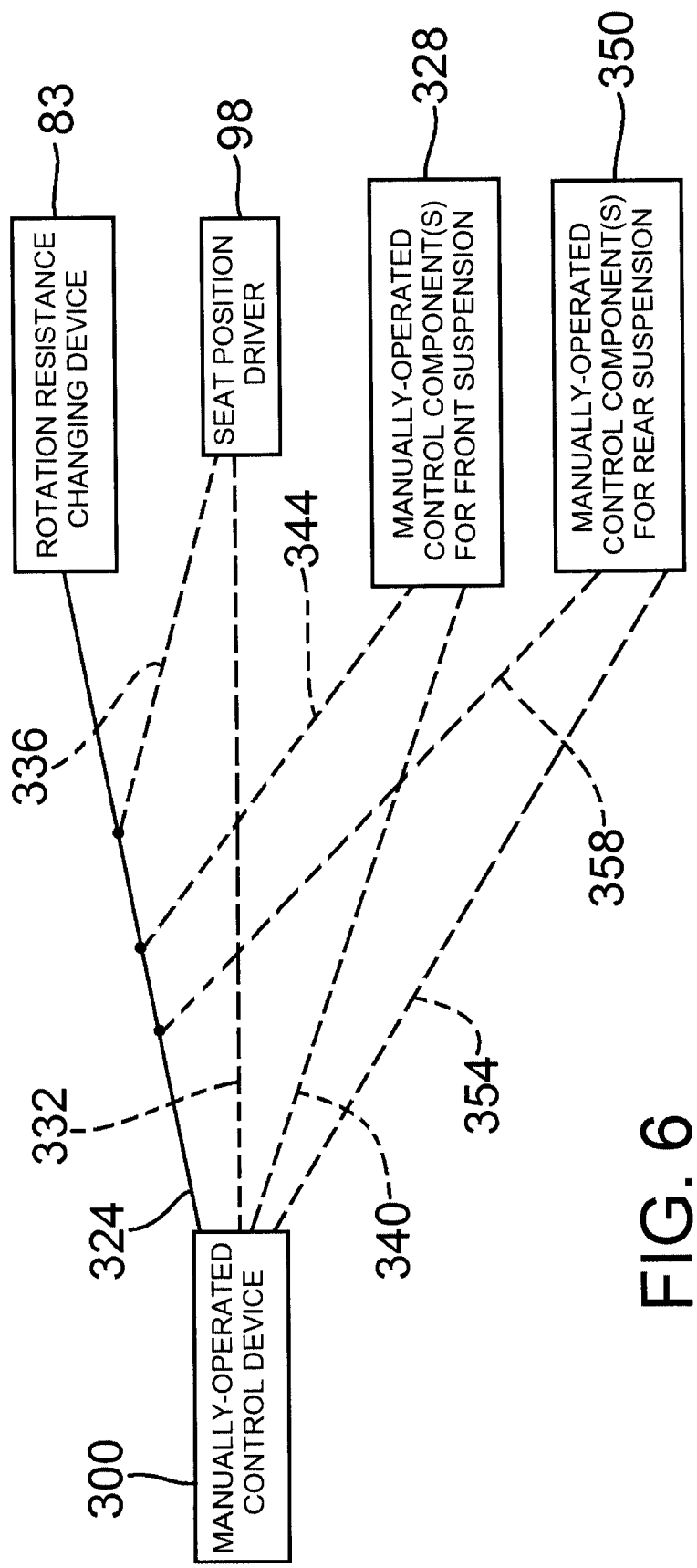
FIG. 6 is a schematic diagram of a manually-operated control device operatively coupled to two or more other bicycle components.

As schematically shown in FIG. 6, manually-operated control device 300 could be operatively coupled to the manually-operated control component in rotation resistance changing device 83 through a first Bowden cable 324 and optionally operatively coupled in parallel to the manually-operated control component in seat position driver 98 through a Bowden cable 332 or through a spliced-in Bowden cable 336, to one or more manually-operated control component(s) 328 in front suspension elements 40 through a Bowden cable 340 or through a spliced-in Bowden cable 344 and/or to one or more manually-operated control component(s) 350 in rear suspension element 26 through a Bowden cable 354 or through a spliced-in Bowden cable 358. Of course, the components could be operatively coupled in series as well.

While air- and oil-operated shock absorbers were disclosed, any pressure-operated or spring-operated shock absorber could be used, such as a hydraulically-operated shock absorber. Any operation characteristic (e.g., pressure; volume; position; movement such as ON/OFF, velocity or acceleration; resistance to movement, etc) of a first member relative to a second member of any number of components may be controlled based upon a similar operation characteristic of one or more reference components.

As used herein, the word "lockout" of a shock absorber does not necessarily mean that the first shock absorbing member (e.g., outer tubular suspension member) is completely immovable relative to the second shock absorbing member (e.g., telescoping inner tubular suspension member). Lockout refers to turning the normal shock absorbing function off. In the lockout state, the first shock absorbing member may have some movement relative to the second shock absorbing member because of manufacturing and/or hydraulic tolerances. Also, some shock absorbers may have a shock threshold beyond which the first shock absorbing member will be allowed to move significantly relative to the second shock absorbing member, or even turn on the normal shock absorbing function, in order to avoid damage to the shock absorber during severe riding conditions.

In the disclosed embodiments, bicycle components such as front suspension elements 40, rear derailleur 80, etc. functioned as slave devices that were operated by master control devices such as command units 108a and 108b. In other words, the bicycle components controlled by command units 108a and 108b did not function as master control devices that directly operated other bicycle components. However, in some embodiments a bicycle component that functions as a slave component also may function as a master control device for some other bicycle component.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle operating characteristic control apparatus comprising:
   a first bicycle component in the form of a rear derailleur including:
      a base member for coupling to a bicycle frame;
      a movable member coupled for movement relative to the base member;
      a chain guide coupled to the movable member for guiding a chain among a plurality of sprockets in response to movement of the movable member;
      a biasing device that provides a biasing force to the chain guide for tensioning the chain; and
      a rotation resistance changing device that changes a rotational resistance of the chain guide relative to the movable member; and
   a second bicycle component that is changeable from a first status to a second status;
   wherein the first bicycle component and the second bicycle component are operatively coupled so that rotational resistance of the chain guide changes in conjunction with a change of status of the second bicycle component.

2. The apparatus according to claim 1 wherein the apparatus changes the rotational resistance of the chain guide and the status of the second bicycle component at approximately the same time.

3. The apparatus according to claim 1 wherein the apparatus changes the rotational resistance of the chain guide after the apparatus changes the status of the second bicycle component.

4. The apparatus according to claim 1 wherein the apparatus changes the status of the second bicycle component after the apparatus changes the rotational resistance of the chain guide.

5. The apparatus according to claim 1 further comprising a control device operatively coupled to the first bicycle component and to the second bicycle component to selectively change the rotational resistance of the chain guide and the status of the second bicycle component.

6. The apparatus according to claim 5 wherein the control device is electrically coupled to at least one of the first bicycle component or the second bicycle component.

7. The device according to claim 5 wherein the control device is mechanically coupled to at least one of the first bicycle component or the second bicycle component.

8. The apparatus according to claim 1 wherein the second bicycle component comprises a bicycle seat.

9. The apparatus according to claim 8 wherein the status of the second bicycle component includes a position of the bicycle seat.

10. The apparatus according to claim 9 wherein the second bicycle component includes a motor for moving the bicycle seat.

11. The apparatus according to claim 1 wherein the second bicycle component comprises a bicycle suspension component.

12. The apparatus according to claim 11 wherein the second bicycle component comprises a front suspension.

13. The apparatus according to claim 11 wherein the second bicycle component comprises a rear suspension.

14. The apparatus according to claim 11 wherein the status of the second bicycle component includes a height or stroke of the suspension.

15. The apparatus according to claim 11 wherein the status of the second bicycle component includes movement of the suspension.

16. The apparatus according to claim 15 wherein the status of the second bicycle component includes a lockout state of the suspension.

17. The apparatus according to claim 1 further comprising a third bicycle component that is changeable from a first status to a second status, wherein the first bicycle component, the second bicycle component and the third bicycle component are operatively coupled so that rotational resistance of the chain guide changes in conjunction with a change of status of the second bicycle component and the third bicycle component.

18. The apparatus according to claim 17 wherein the second bicycle component comprises a bicycle suspension component, and wherein the third bicycle component comprises a bicycle seat.

* * * * *